United States Patent [19]

Sumi et al.

[11] 4,442,252

[45] Apr. 10, 1984

[54] COLD-SET ADHESIVE COMPOSITIONS COMPRISING POLYVINYL ALCOHOL FOR PAPER AND PAPER BOARD

[75] Inventors: Masao Sumi, Nara; Junichi Suenaga, Osaka; Masazo Takenaka, Hyogo; Itaru Murano, Osaka; Mikio Tanabe; Kiyoshi Hirai, both of Okayama, all of Japan

[73] Assignees: Unitika Ltd., Hyogo; Okayama Paper Mill Co., Ltd., Okayama, both of Japan

[21] Appl. No.: 366,619

[22] Filed: Apr. 8, 1982

Related U.S. Application Data

[63] Continuation of Ser. No. 206,605, Nov. 13, 1980, abandoned.

[30] Foreign Application Priority Data

Nov. 13, 1979 [JP] Japan ............................. 54-146820

[51] Int. Cl.³ .................................................. C08K 3/38

[52] U.S. Cl. .......................................................... 524/183

[58] Field of Search ............... 524/183, 184, 185, 404, 524/405

[56] References Cited

U.S. PATENT DOCUMENTS

3,632,362  1/1972  Urushiyama ...................... 524/405
3,632,786  1/1972  Nickerson ......................... 524/405

*Primary Examiner*—Paul R. Michl
*Attorney, Agent, or Firm*—Sughrue, Mion, Zinn, Macpeak & Seas

[57] ABSTRACT

Adhesives prepared by dissolving polyvinyl alcohol, a filler and a water-soluble boron compound in water are described. These adhesives are "cold-set" adhesives which are liquid at a temperature of 60° C. or more, but lose their fluidity to gelatinize on cooling at a temperature higher than 20° C., they are very useful for a cold corrugation system.

13 Claims, 2 Drawing Figures

COLD-SET ADHESIVE COMPOSITIONS COMPRISING POLYVINYL ALCOHOL FOR PAPER AND PAPER BOARD

This is a continuation, of application Ser. No. 206,605 filed Nov. 13, 1980 abandoned.

BACKGROUND OF THE INVENTION

The present invention relates to cold-set adhesives for a cold corrugation system.

At present, as adhesives for corrugated board, starch adhesives comprising corn starch prepared by a Stein-Hall process are conventionally used. In the Stein-Hall process, a liquid mixture composed of a carrier solution and a main slurry is used as the liquid adhesive, but preparation of the liquid mixture is complicated. Further, in production of corrugated board with using such a starch adhesive, the liquid adhesive is applied to flute tips of the corrugating medium and then liners are adhered to the corrugating medium. In this case, solidification of the liquid adhesive is carried out by the so-called hot-corrugation system, which comprises compulsorily heating, by means of hot plates heated to from about 150° C. to 160° C.

An aqueous solution of polyvinyl alcohol has sometimes been used as the adhesive for corrugated board. However, this adhesive is expensive as compared with starch and it cannot be applied to high-speed corrugating machines because solidification takes a long period of time (because solidification is carried out by condensation with evaporation of water).

U.S. Pat. No. 4,094,718 has disclosed an adhesive comprising a powdered polyvinyl alcohol together with starch. This adhesive is prepared by dispersing a finely divided powder of polyvinyl alcohol in an aqueous solution of starch, which essentially is an improved variation of the Stein-Hall process. In this case, it is also necessary for solidification of the adhesive to compulsorily heat by means of hot plates. As described above, since much heat energy is consumed in Stein-Hall process today, economical problem is caused by energy consumption.

Further, from the viewpoint of quality of the corrugated board sheets, there is a problem in the case of solidifying by heating, in that water premeated into paper by application of the aqueous solution of starch is compulsorily removed by dring, which may cause warping because of uneven stretching of the paper, and such warping may created problems in a subsequent carton making process.

Recently, development of the so-called cold-set adhesives, by which adhesion is carried out without using hot plates, and development of cold-corrugation systems using such adhesives have been of great interest in view of abnormal increases in energy costs. For example, J. J. Becker, G. E. Lauterback, G. R. Hoffman and R. C. Mc Kee have done fundamental studies using a chemically modified starch solution prepared by adding sodium sulfite, NaOH, $Na_2CO_3$ or $NaHCO_3$ to pearl corn starch and additionally adding $(NH_4)_2S_2O_8$ thereto, as has been described in *Paper Board Packaging*, Vol. 59, No. 6, p. 22 (1974). This adhesive is a so-called cold-set adhesive, which is used in liquid state at 88° C. or more and gelatinizes at 60° to 70° C. However, the gelatinized adhesive is the so-called irreversible gel that the adhesive does not become liquid even if heated again to 90° C. or more, when it is once gelatinized. A cold-corrugation system using the abovedescribed cold-set starch adhesive for corrugated board has been reported by Clude H. Sprague in *Tappi*, Vol. 62, No. 6, pp. 45–48 (1979). However, it has not been put to practical use up to the present time. There are problems with such a system, viz., that the initial adhesive property during the period from adhesion of the corrugating medium to liners to the process by a slitter is poor, and the liquid adhesive does not sufficiently premeate into the paper.

Furthermore, as a process of using synthetic resins, use of cross-linking water-soluble resins has been reported in *Boxboard Containers*, p. 26, May (1979). In this case, the adhesive becomes insoluble in water after adhesion and, consequently, recovery of waste paper becomes difficult.

On the other hand, there have been additional attempts at using hot-melt adhesives. In this case, the adhesives are expensive and recovery of waste paper is also difficult because the adhesives are insoluble in water.

Furthermore, a process using synthetic resin emulsions, such as a polyvinyl-acetate emulsion, has been proposed. This process also cannot be commercially utilized because this adhesive is more expensive than starch adhesives.

Recently, a cold-set adhesive comprising a polyvinyl alcohol as one component has been reported by Gerard de Knegt, of Switzerland, in *Weekly Packing News*, Nos. 737 and 738, Apr. 5 and Apr. 12, 1980. However, the composition of this adhesive is not fully described. It has been merely disclosed that when the solid content is 47% by weight and 33% by weight, the viscosity of the aqueous solution of the adhesive is 3,100 centipoises and 2,400 centipoises at the temperature of 25° C., respectively, and the pH of the adhesive solution is from 6 to 7. Further, it has been reported that the adhesive is not used by a complete cold-set method, because adhesion is carried out with about six hot plates.

SUMMARY OF THE INVENTION

An object of the present invention is to provide adhesives for paper which have a cold-setting property.

As a result of extensive studies concerning cold-set adhesives which can be applied to paper at a high temperature because of being liquid, but which gelatinize upon cooling, the present inventors have accomplished the present invention.

More particularly, the present invention relates to cold-set adhesives for paper consisting essentially of polyvinyl alcohol (hereinafter referred to as PVA), a filler, a water-soluble boron compound, and water.

These adhesives have properties such that they are liquids having fluidity capable of application to paper by means of roll coater at 60° C. or more but lose their fluidity by cooling to a room temperature to gelatinize. In the case of starch adhesives, when the adhesives are once gelatinized, they do not become a solution again even if the temperature is elevated by reheating. But the adhesives of the present invention have the characteristic that they show the so-called thermally reversible gel-sol behavior (viz., that the gelatinized adhesives become a solution having nearly the same viscosity as that of the original state when the temperature is re-elevated to 60° C. or more). Accordingly, cleaning of conduits is easily carried out, because the adhesives become a solution again by heating even if they gelatinize in the conduits.

The adhesives of the present invention have an excellent film forming property and high film strength as compared with starch adhesives, and as a result, the adhesive strength thereof is high. Further, their water resistance is superior to that of starch adhesives. However, even though the water resistance of the adhesives of the present invention is excellent, recovery of waste paper is not difficult, because the adhesives are soluble in water, which distinguishes them from the prior adhesives comprising cross-linking type water-soluble resins or hot melt adhesives.

The adhesives of the present invention are more economical than synthetic resin emulsion adhesives or hot-melt adhesives, and they can compete economically the starch adhesives.

When the adhesives of the present invention are applied in a liquid state to paper at a high temperature and adhesion is carried out just after application, they are solidified within a short period of time of less than about 30 seconds, and complete adhesion, which is determined by the tearing of paper by the adhesion test described below, can be easily obtained. Accordingly, it becomes possible to carry out high-speed adhesion at a rate of 150 m/min or more. In addition, the use of hot plates as required in the case of producing the prior art production of corrugated board is not necessary, because heating is not necessary for solidification of the adhesives, and, consequently, economy of heat energy can be practiced. Further, they are desirable adhesives from the viewpoint of improvement of quality and improvement of processing properties, because they do not cause nonuniform distribution of water in the papers or warping of corrugated board due to heating.

DETAILED DESCRIPTION OF THE INVENTION

Figure 1:
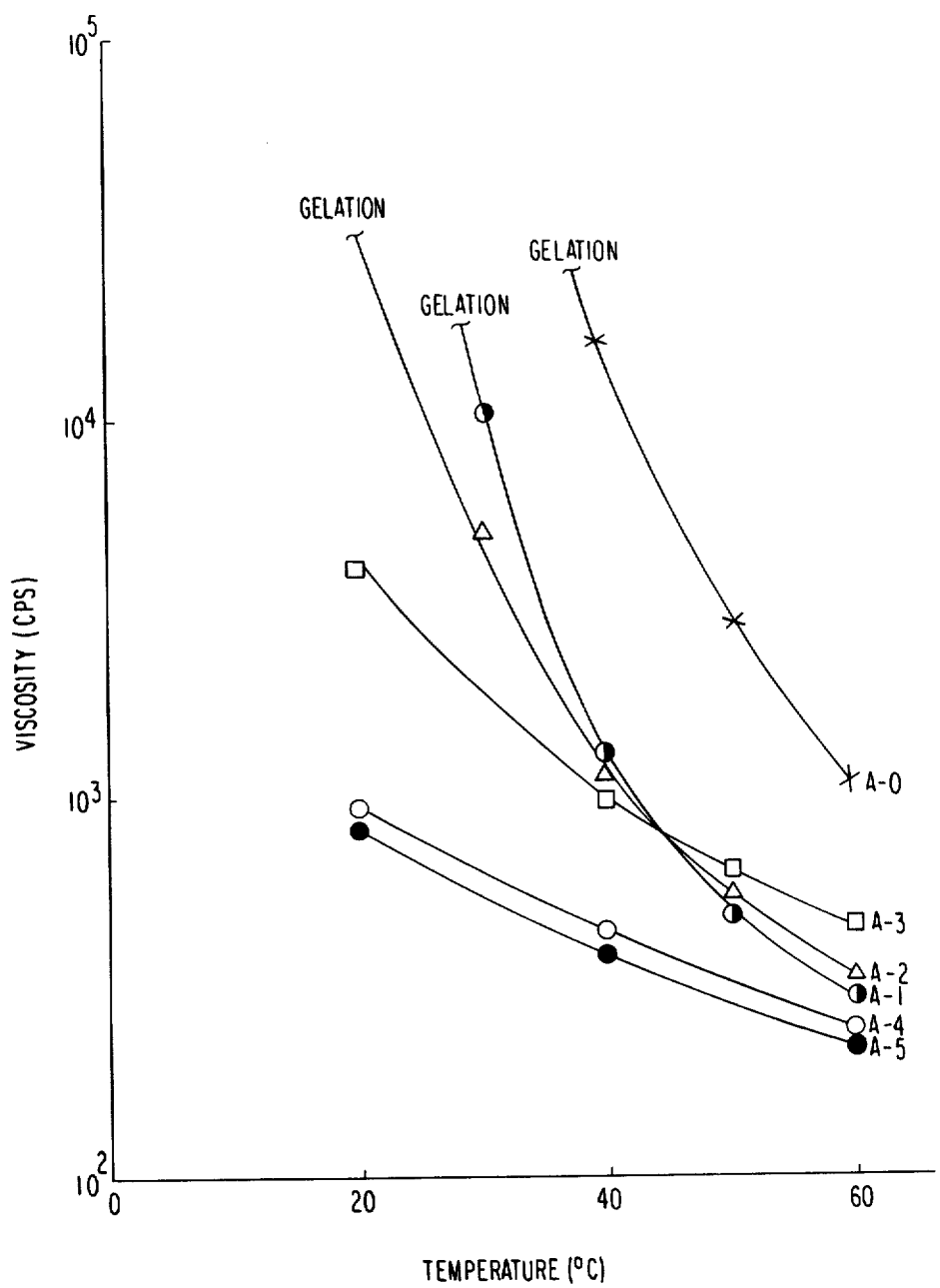
FIG. 1 is a graph which shows the temperature dependence of viscosity in an example of adhesives of the present invention together with comparative examples.

The adhesives of the present invention consist essentially of PVA, a filler, a water-soluble boron compound, and water. It is necessary to consider the following matters with respect to the initial adhesive property, adhesive strength and viscosity of liquid adhesive.

As PVA used in the present invention, those having an average degree of polymerization of from about 500 to 3,000, and a degree of hydrolysis of about 80 mol% or more are preferred. Particularly, PVA having a saponification value of about 97 mol% or more is preferred because of its water resistance. PVA having about 1,000 to about 2,000 of the average degree of polymerization is preferred in respect of adhesive strength and processing property. The average degree of polymerization and the degree of hydrolysis of PVA are measured by the following tests.

The average degree of polymerization is determined by measuring a viscosity of a 1 wt% aqueous solution of PVA at 30° C. by means of a capillary viscometer (Ubbelohde No. 1 or Cannon Fenske No. 100) and calculating from the following formula:

$$\log \bar{p}_A = 1.613 \log \frac{10^4}{8.29} \left( \frac{2.303}{C_U} \log \frac{t_1}{t_0} \right)$$

wherein
$\bar{p}_A$ = Average degree of polymerization $\left( \frac{2.303}{C_U} \log \frac{t_1}{t_0} \right)$ = Limiting viscosity (g$^{-1}$l$^{-1}$)

$t_1/t_0$ = Relative viscosity
$C_U$ = Concentration (g/l)
$t_0$ = Flow time of water (sec)
$t_1$ = Flow time of sample (sec)

The degree of hydrolysis of PVA is obtained by measuring residual acetic acid radicals by consumption of alkali and calculating from the following formulae:

$$A = \frac{0.60 \times (a - b) F}{S \times P} \, (\%),$$

$$B = \frac{44.05 A}{60.06 - 0.42 A} \, (\text{mol } \%), \text{ and}$$

$$C = 100 - B \, (\text{mol } \%)$$

wherein
A = Weight of residual acetic acid radical (%)
B = Residual acetic acid radical (mol%)
C = Degree of hydrolysis (mol%)
S = Weight of original sample (%)
P = Pure component (%)
F = Factor of 0.1 N NaOH solution
a = Volume of 0.1 N NaOH solution consumed (ml)
b = Volume of 0.1 N NaOH solution in this blank test (ml)

As the filler used in the present invention, there are, for example, clays such as kaolinite, sericite, pyrophyllite, montmorillonite or talc, etc., and inorganic fillers such as calcium carbonate, satin white, titanium dioxide, aluminium hydroxide, barium sulfate, calcium sulfate, magnesium oxide or magnesium hydroxide, etc. Among them, those which show alkalinity in an aqueous dispersion are preferred, and, particularly, calcium carbonate is the most suitable filler. In the case of calcium carbonate, temperature dependence of viscosity of the aqueous solution of PVA/filler particularly increases by addition of a small amount of the water-soluble boron compound, as described in more detail hereinafter, which is suitable for the purpose of the present invention.

As the water-soluble boron compound used in the present invention, there are, for example, boric acid, borates such as borax, etc., and boric acid esters of polyhydric alcohols such as glycerine or ethylene glycol, etc. Among these water-soluble boron compounds, boric acid is preferred. Particularly, combinations of boric acid and basic fillers such as calcium carbonate, etc., are the most preferred for the purpose of the present invention from the viewpoint of cold-setting properties, adhesive strength, and costs.

In the adhesives of the present invention, it is possible to add other additives within ranges which do not damage the basic properties of the adhesives, for example, defoaming agents such as polyoxyalkylene glycol derivatives, alkyleneglycol aliphatic acid esters or polyethylene oxide-polypropylene oxide copolymers, etc., paper permeating agents such as anionic surface active agents, etc., antifungal agents composed of organic nitrogen and sulfur containing substances, and plasticizers such as polyhydric alcohols such as glycerine and esters thereof, etc. Further, as adhesive components, it is possible to add cellulose compounds such as starch, etc., and chemically modified products thereof, water-soluble resin such as polyacrylic acid or polyacrylamide, etc., and inorganic compounds such as water glass, etc., within the range of not damaging the cold-setting property.

The adhesives of the present invention are liquid at a high temperature, but the viscosity thereof rapidly increases as the temperature decreases, and the adhesives gelatinize as the temperature falls to room temperature (20° C.). The resulting gelatinized products are thermoplastic which can be converted to the liquid state again by raising of the temperature. Among them, those having a viscosity of from about 100 to 2,000 centipoises, particularly, 100 to 1,000 centipoises, measured at 60° C. by a Brookfield revolving viscosimeter are preferred. If the viscosity at 60° C. is less than 100 centipoises, permeation of the solution into the paper layer becomes too large, causing poor adhesion, because the adhesive layer on the paper surface is thin. On the other hand, if the viscosity exceeds 2,000 centipoises, permeation of the solution into the paper layer is inferior to easily cause poor adhesion. In the present invention, it is particularly preferred that the adhesives gelatinize before cooling to 20° C. If additives which do not gelatinize at 20° C. are used, 1 minute or more of the setting time is required for adhesion. For example, in the case of utilizing them in a process for producing corrugated board, a shear of adhesion parts may be easily caused during transfer to the next process, if the production rate of the corrugated board is not reduced.

In the adhesives of the present invention, it is preferred that the mixing ratio of PVA to the filler is in the range of from about 20/80 to about 70/30 (parts by weight). If PVA is less than about 20 parts by weight, adhesive strength tends to be reduced. On the other hand, if it exceeds about 70 parts by weight, the temperature dependence of viscosity becomes small, and the adhesives are economically disadvantageous. The amount of the water-soluble boron compound is in the range of from about 0.2 to 4 parts by weight, and preferably from 0.3 to 2 parts by weight, per 100 parts by weight of PVA and filler (that is, the total weight of PVA and filler). If the amount of the water-soluble boron compound is less than 0.3 part by weight, temperature dependence of viscosity of the aqueous solution tends to be reduced. On the other hand, if it exceeds 2 parts by weight, permeation of the solution into the paper layer tends to deteriorate because of increasing the viscosity of the solution, by which inferior adhesion is easily caused.

The adhesives of the present invention can be prepared, for example, as follows. To a blender equipped with a stirrer, PVA, a filler, and a water-soluble boron compound are charged, preferably in the order listed. After mixing homogeneously, water is added to the resulting mixture, and the mixture is dissolved by heating to 90° C. or more. In this case, viscosity of the resulted solution is measured by means of, for example, a Brookfield revolving viscosimeter while varying the temperature, by which, for example, composition of the mixture or solid content in the aqueous solution is suitably controlled so that the solution shows a cold-setting property and, preferably, the viscosity at 60° C. is from 100 to 2,000 centipoises and the solution gelatinizes before cooling to 20° C.

The adhesives of the present invention are in a gelatinized state at a room temperature, which have neither fluidity nor adhesive property. However, when they are heated, they become a fluid as the temperature increases, to form a solution having the viscosity (100 to 2,000 centipoises) rendering them capable of application to paper at 60° C. Accordingly, in the case of practically utilizing them for adhesion of paper, for example, a solution heated to 90° C. or more is applied to paper at from about 60° C. to 80° C., and is gelatinized to complete the adhesion. If the solution is gelatinized by cooling, it can be applied to paper by reheated to 60° C. or more.

Permeability of the liquid adhesive into paper to be applied depends on the degree of sizing, bulk density, presence or absence of a surface coat, and basis weight. Therefore, in the case of requiring an improvement of permeation, the liquid adhesive is heated to about 80° C. and applied to the paper, which is also preheated.

Further, in the case of producing corrugated board with using the adhesives of the present invention, it is preferred to increase the solid content of the liquid adhesives to reduce the amount of water to be introduced into the paper, by which warps of the produced corrugated board sheets can be diminished. The adhesives of the present invention are preferred to have about 20% or more by weight of the solid content. In this case, it is of course preferred that the viscosity of the liquid adhesives at 60° C. is in the range of from about 100 to 2,000 centipoises.

In FIG. 1, the temperature dependence of the viscosity in the adhesives of the present invention is shown together with that of comparative examples. The compositions of the adhesives in this case are shown in Table 1.

TABLE 1

| | Experiment No. | PVA* (part by weight) | Calcium Carbonate (part by weight) | Boric Acid (part by weight) | Solid Content in Aqueous Solution (% by weight) |
|---|---|---|---|---|---|
| Present | A-0 | 35 | 64.5 | 0.5 | 21.3 |
| Invention | A-1 | 35 | 64.5 | 0.5 | 18.0 |
| | A-2 | 65 | 34.5 | 0.5 | 11.5 |
| Comparative | A-3 | 80 | 19.5 | 0.5 | 10.3 |
| | A-4 | 99.5 | — | 0.5 | 9.5 |
| Example | A-5 | 35 | 65 | — | 22.0 |

*PVA: Degree of polymerization 1680, Degree of hydrolysis 98.5 mol %

It is understood from FIG. 1 that the temperature dependence of the viscosity of the aqueous solution is large in case of A-0, A-1 and A-2 of the present invention, and the adhesives are gelatinized at 20° C.

Figure 2:
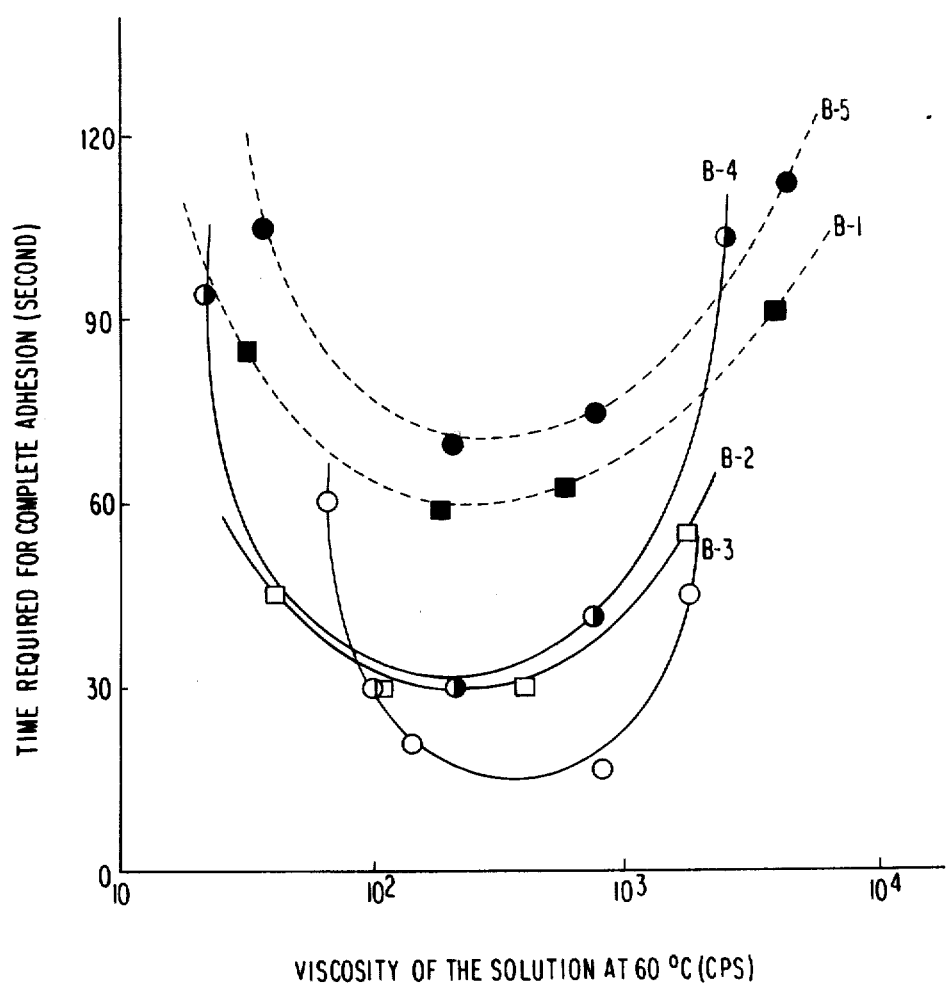
FIG. 2 is a graph which shows, for various adhesives, the relation between viscosity at 60° C. of the adhesive and the time required for complete adhesion.

In FIG. 2, the relationship of the viscosity at 60° C. of the adhesives and time necessary to carry out complete adhesion in the case of allowing to adherence to liners (basis weight: 360 g/m$^2$) is shown mutually. In FIG. 2, the shorter the time necessary to carry out complete adhesion, the more excellent is the initial adhesive strength. The compositions of the adhesives in this case are shown in Table 2.

TABLE 2

| Experiment No. | PVA* (part by weight) | Calcium Carbonate (part by weight) | Boric Acid (part by weight) |
|---|---|---|---|
| B-1 | 35 | 64.9 | 0.1 |
| B-2 | 35 | 64.7 | 0.3 |
| B-3 | 35 | 64.0 | 1.0 |
| B-4 | 35 | 63.0 | 2.0 |
| B-5 | 35 | 62.0 | 3.0 |

*PVA: Degree of polymerization 630, Degree of hydrolysis 98.9 mol %

Since the production rate of corrugated board is generally from 60 to 200 m/minute, adhesion of flute tips of the corrugating medium to the liner sheets causes stripping or shear in the next process (slitter or cutter), if complete adhesion does not conclude within less than a minute (preferably less than 40 seconds) after being brought into contact. From this viewpoint, it is understood from FIG. 2 that the amount of boric acid is particularly preferred to be in the range of from about 0.3 to 2.0 parts by weight. Further, it is understood that the viscosity at 60° C. of the adhesive is important to be in the range of from about 100 to 2,000 centipoises, and preferably from 100 to 1,000 centipoises.

In order to adhere papers using adhesives of the present invention, a solution of the adhesive, for example, is applied by means of a roller coater (Plane roller or Anilox roller) so as to be, preferably, 5 g/m² or more of the solid content, and the papers are brought into contact at once. After brought into close contact, cold-setting adhesion is carried out by cooling to room temperature. In this case, the paper applied may be at room temperature or may be heated to more than room temperature.

The adhesives of the present invention are used for papers, and can be utilized for adhesion of various kinds of papers. For example, they can be suitably used for production of corrugated boards, laminating boards, cartons, cases and paper tubes, etc. Particularly, in case of production of corrugated boards, they are very useful for saving energy cost and improving quality of the corrugated boards. Further, they can be used, of course, for adhesion of paper to other materials, such as paper to leather, paper to wood or paper to metal, etc.

In the following, the present invention will be illustrated in greater detail with reference to examples.

EXAMPLE 1 AND COMPARATIVE EXAMPLE 1

35 parts by weight of PVA having an average degree of polymerization of 1,680 and a degree of hydrolysis of 98.6 mol%, 64.5 parts by weight of calcium carbonate powder, and 0.5 part by weight of boric acid were uniformly mixed using a blender. The resulting mixture was dissolved in water by steam to produce a solution having a concentration of 18% by weight. This solution had a viscosity of 300 centipoises (CPS) at 60° C. and it completely gelatinized at 20° C. at which the viscosity thereof became more than 80,000 CPS.

After this aqueous solution was heated to 70° C., it was applied to a surface of a liner having 360 g/m² of the basis weight so as to be about 50 g/m² of the coating amount. Then, the surface to which the aqueous solution was applied was immediately brought into contact with another liner of the same quality, and they were allowed to leave under 250 g/cm² of load at room temperature, by which complete adhesion such that paper layers were torn under peeling test was obtained after 20 seconds.

For the purpose of comparison, an aqueous solution having 10% by weight of the concentration was prepared with using 99.5 parts by weight of the same PVA and 0.5 part by weight of boric acid by the same manner as the above-described case. This solution had 290 CPS of the viscosity at 60° C., but it did not gelatinize at a room temperature. Adhesion of liners was carried out using this solution by the same manner as described above, but complete adhesion could not be attained after 60 seconds.

EXAMPLE 2

30 parts by weight of PVA having an average degree of polymerization of 1,690 and a degree of hydrolysis of 99.5 mol%, 69.5 parts by weight of calcium carbonate powder, and 0.5 part by weight of boric acid were uniformly mixed using a blender. The resulting mixture was dissolved in water by steam to produce a solution having a concentration of 18% by weight. This solution had a viscosity of 700 CPS at 60° C. and 7,000 CPS at 40° C., and it gelatinized at 30° C., at which the viscosity became more than 50,000 CPS.

After the solution having the above-described properties was heated to 70° C., it was applied to flute tips of a single-faced corrugated board of B flute (number of flute tips is 50±2/30 cm; JIS Z-1516, JIS refers to Japan Industrial Standard) so as to be about 5 g/m² of the solid content. The flute tips to which the solution was applied were immediately brought into contact with a kraft liner K 200 (produced by Honshu-Seishi Co., Ltd. in Japan), and they were allowed to leave under 250 g/cm² of the load at a room temperature, by which complete adhesion was obtained after 25 seconds. After the resulting adhesion strip was conditioned at 20° C. and 65% RH (relative humidity) for 24 hours, adhesive strength of the adhesion parts was measured using a pin attachment for single-faces. The adhesive strength was 33.9 kg.

On the other hand, the adhesive strength of the conventional corrugated board produced using conventional corn starch and the same papers as described above was 32.1 kg.

EXAMPLE 3 AND COMPARATIVE EXAMPLE 2

35 parts by weight of PVA having an average degree of polymerization of 630 and a degree of hydrolysis of 98.5 mol%, 64 parts by weight of a finely-divided powder of calcium carbonate, and 1.0 part by weight of boric acid were uniformly mixed using a blender. An aqueous solution of the resulting mixture having a concentration of 29.8% by weight had 150 CPS of the viscosity at 60° C. and it gelatinized at 20° C., at which the viscosity became more than 60,000 CPS.

After this aqueous solution was heated to 60° C., it was applied to a surface of a liner having 360 g/m² of the basis weight, so as to be coated at about 50 g/m². Then the surface to which the above-described aqueous solution was applied was brought into contact with another liner of the same quality, and they were allowed to stand at a room temperature, by which complete adhesion that paper layers were broken was obtained after 30 seconds.

For the purpose of comparison, the same aqueous solution as the above-described adhesive was prepared, except that the concentration was 22.5% by weight. This aqueous solution had a viscosity of 40 CPS at 60°

C. and did not gelatinize at a room temperature. Adhesion of liners was carried out using this solution in the same manner as described above, but complete adhesion could not be obtained after 2 minutes. The reason is believed to be that the adhesive excessively permeates into the paper layer at application, because the viscosity of the adhesive is too low, and consequently the adhesive layer left on the paper surface becomes very thin.

EXAMPLES 4 AND 5

35 parts by weight of PVA having an average degree of polymerization of 630 and a degree of hydrolysis of 98.0 mol%, 63 parts by weight of a finely-divided powder of calcium carbonate, and 2 parts by weight of boric acid were uniformly mixed with using a blender. An aqueous solution of the resulted mixture having 24.9% by weight of the concentration had 200 CPS of the viscosity at 60° C. and it completely gelatinized at 20° C. at which the viscosity was more than 60,000 CPS. This aqueous solution was heated to 70° C. and applied to a surface of a liner having 360 g/m² of the basis weight so as to be coated at about 60 g/m². Then, the surface to which the aqueous solution was applied was brought into contact with another liner of the same quality, and they were allowed to leave at room temperature, by which complete adhesion such that the paper layers were broken under peeling test was obtained after 20 seconds.

Further, an aqueous solution of the same mixture having 29.6% by weight of the concentration had 2,100 CPS of the viscosity at 60° C. and completely gelatinized at 40° C. When the liners were allowed to adhere mutually using this solution in the same manner as described above, complete adhesion was attained only after the lapse of more than 60 seconds. The reason is believed to be that the adhesive does not sufficiently permeate into the paper layer because the viscosity of the adhesive is high, by which the adhesion becomes difficult.

EXAMPLE 6

35 parts by weight of PVA having 1,680 of the average degree of polymerization and 98.6 mol% of the degree of hydrolysis, 64.5 parts by weight of kaolin, and 0.5 part by weight of borax were uniformly mixed using a blender. An aqueous solution of the resulting mixture having a concentration of 18% by weight had a viscosity of 250 CPS at 60° C. and completely gelatinized at 20° C.

When liners were allowed to adhere mutually using this aqueous solution in the same manner as in Example 1, complete adhesion was obtained after 30 seconds.

EXAMPLE 7

40 parts by weight of PVA having an average degree of polymerization of 1,690 and a degree of hydrolysis of 99.5 mol%, 59.5 parts by weight of calcium carbonate, and 0.5 part by weight of glycerine ester of boric acid were uniformly mixed using a blender. An aqueous solution of the resulting mixture having a concentration of 17% by weight had a viscosity of 400 CPS at 60° C., and was completely gelatinized at 20° C.

When liners were allowed to adhere mutually using this aqueous solution in the same manner as in Example 1, complete adhesion was obtained after 20 seconds.

Furthermore, to a sheet of 15 mm×150 mm composed of kraft liner having 360 g/m² of the basis weight, the above-described aqueous solution heated to 70° C. was applied so as to be coated at 50 g/m² on an area of 15 mm×15 mm. Then, it was brought into contact with the same kraft liner and adhesion was carried out at a room temperature for 20 seconds under a load of 250 g/cm². The adhered paper sheet was conditioned at 20° C. and 65% RH for 24 hours. When tensile shearing force was measured by means of Strograph R-500 (made by Toyo-Seiki Co., Ltd. in Japan), it was 20.1 kg/cm². This value was nearly equal to the destruction strength of paper.

EXAMPLE 8

The same adhesive as that of Example 2, except that the concentration was 16.9% by weight, had 300 CPS of the viscosity at 60° C. It was gelatinized at 20° C. at which the viscosity exceeded 80,000 CPS.

With using this aqueous solution, adhesion of a liner and a corrugating medium was carried out in the double facer of the corrugating machine. In this experiment, the glue vat was heated to keep the temperature of the adhesive at 75° C., and the operation was carried out at room temperature without preheaters for the liner and the single faced corrugated board,, and also without the heating plate. The single faced corrugated board used was B flute. The lamination rate was 80 m/min which was a conventional operation rate for corrugated boards. After 25 seconds from the lamination, the corrugated board sheet was stripped by pulling, but the paper layer was not broken at the adhesion parts, which meant complete adhesion.

The amount of consumption of the adhesive (as solid content) and the adhesive strength (measured on double facor adhesion parts by means of a pin attachment for single-face) in the above-described experiment were compared with those of the case of adhering by the conventional method with using conventional starch adhesive. The results obtained are shown in Table 3.

TABLE 3

|  | Conventional Starch Adhesive | Present Invention |
|---|---|---|
| Solid Content | 5.2 g/m² | 4.1 g/m² |
| Adhesive Strength | 33.8 kg | 31.3 kg |

EXAMPLE 9

25 parts by weight of PVA having an average degree of polymerization of 1,680 and a degree of hydrolysis of 99.4 mol%, 74.7 parts by weight of a finelydivided powder of calcium carbonate, 0.3 part by weight of boric acid and 0.2 part by weight of Adeka pluronic L-61 (produced by Asahi Denka Kogyo Co., Ltd. in Japan) as a defoaming agent were uniformly mixed using a blender. The resulting mixture was dissolved in water to prepare a liquid adhesive having a concentration of 28% by weight. This liquid adhesive had the viscosity of 1,900 CPS at 60° C. and was gelatinized at 20° C.

After the liquid adhesive having such properties was heated to 80° C., it was applied to flute tips of a single-faced corrugated board of A flute (number of flute tips is 34±2/30 cm; JIS Z-1516) so as to be about 4.5 g/m² of the solid content. It was then brought into contact with a liner K200 preheated to about 80° C., and the board was allowed to leave at a room temperature for 9 seconds under 250 g/cm² of the load. After the resulting adhesion sheet (8 cm×8 cm) was conditioned at 20° C. and 65% RH for 24 hours, adhesive strength of the adhesion parts was measured with using a pin attachment for single face. The adhesive strength was 25.4 kg.

On the other hand, adhesive strength of a conventional corrugated board of A flute produced using conventional corn starch and the same papers was 21.4 kg.

EXAMPLE 10

A production test of a corrugated board was carried out by adhesion of B flute K200/SCP125 (SCP125 was produced by Okayama-Seishi Co., Ltd) to a liner K200 in the double-facer part of the corrugating machine using the same adhesive as in Example 9. The operation was carried out such that the lamination rate was 200 m/min, the B flute of single-faced corrugated board was heated to about 60° C. by a preheater, the liner was heated to about 90° C. by a preheater, and the liquid adhesive was applied to flute tips of the B flute at about 80° C. so as to be about 6g/m² of the solid content. This B flute and liner were brought into contact, after that, the sheet was passing through between canvas sheets and rollers without using hot plates, and then, the sheet was processed by a slitter and a cutter. The time need from applying to processing was 7 seconds.

As a comparative experiment, a corrugated board sheet was produced from the same B flute and liner using a liquid adhesive having a concentration of about 22% composed of corn starch by a Stein-Hall process at about 40° C. In this case the sheet was passed over a hot plate heated to about 160° C.

Using the resulting corrugated board sheets, small cartons of 25 cm×20 cm×15 cm were made, and strengths of the corrugated boards were measured. The results are shown in Table 4. All samples were measured by JIS Standard after conditioning at 20° C. and 65% RH for 24 hours.

TABLE 4

| Sample | | Present Invention (PVA) | Comparative Example (starch) | JIS No. |
|---|---|---|---|---|
| Compressive strength | kg | 224 | 154 | JIS Z-0212 |
| Bursting strength | kg/cm² | 10.8 | 9.36 | JIS P-8131 |
| Impact punching strength | kg-cm | 43.7 | 40.8 | JIS P-8134 |
| Column crush | kg/cm² | 63.7 | 59.6 | JIS Z-0401 |
| Flat crush | kg/cm² | 2.43 | 2.41 | JIS Z-0401 |
| Adhesive strength | kg | 30.8 | 27.6 | JIS Z-0402 |

It is understood from Table 4 that the carbon made of corrugated board sheets using the adhesive of the present invention is excellent in strength as compared with that produced using the starch adhesive.

When the corrugated board sheet produced using the adhesive of the present invention was dipped in water at 24° C. for 24 hours, spontaneous separation of the liner and the corrugating medium was not observed. However, in the corrugated board sheet of Comparative Example using starch, spontaneous separation occurred when dipped in water for about 40 minutes.

While the invention has been described in detail and with reference to specific embodiments thereof, it will be apparent to one skilled in the art that various changes and modifications can be made therein without departing from the spirit and scope thereof.

What is claimed is:

1. A cold-set adhesive for paper having a viscosity of from about 100 to 2,000 centipoises at 60° C. and which gelatinizes upon cooling at a temperature higher than 20° C. and consisting essentially of polyvinyl alcohol, a filler which exhibits alkalinity in an aqueous dispersion, a water-soluble boron compound, and water, the mixing ratio by weight of polyvinyl alcohol to filler being from about 20/80 to 70/30 and the amount of the water-soluble boron compound being from about 0.2 to 4 parts by weight per 100 parts by weight of polyvinyl alcohol plus filler.

2. An adhesive according to claim 1 having a viscosity of from 100 to 1,000 centipoises at 60° C.

3. An adhesive according to claim 1 wherein the polyvinyl alcohol has a degree of hydrolysis of about 97 mol% or more.

4. An adhesive according to claim 1 wherein the filler is an inorganic filler.

5. An adhesive according to claim 1 wherein the filler is talc.

6. An adhesive according to claim 4 wherein the inorganic filler is selected from the group consisting of, aluminium hydroxide, magnesium oxide, and magnesium hydroxide.

7. An adhesive according to claim 4 wherein the inorganic filler is calcium carbonate.

8. An adhesive according to claim 1 wherein the water-soluble boron compound is a boric acid.

9. An adhesive according to claim 1 wherein the water-soluble boron compound is a borate.

10. An adhesive according to claim 9 wherein the borate is borax.

11. An adhesive according to claim 1 wherein the water-soluble boron compound is a boric acid ester.

12. An adhesive according to claim 1 wherein the filler is calcium carbonate and the water-soluble boron compound is boric acid.

13. An adhesive according to claim 1, 3, 4, 5, 7, 8, 9, 10, 11, 12, or 13 wherein the amount of the water-soluble boron compound is from 0.3 to 2 parts by weight per 100 parts by weight of polyvinyl alcohol and filler.

* * * * *